Jan. 7, 1941.   L. C. WEATHERS   2,227,472
MOTOR SYSTEM
Filed June 30, 1939   2 Sheets-Sheet 1

Inventor
Leland Clay Weathers
By Raeon & Thoma
Attorneys

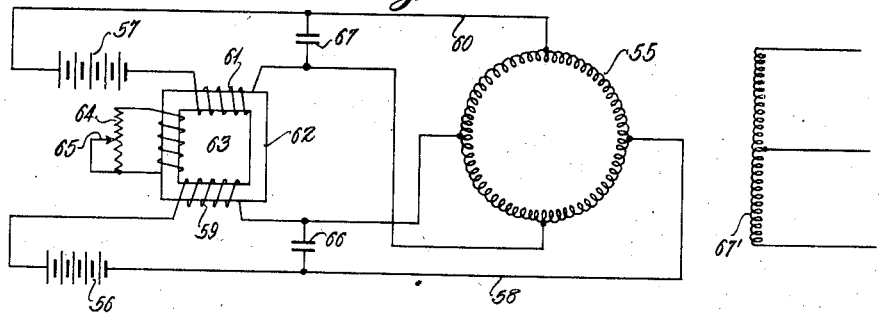
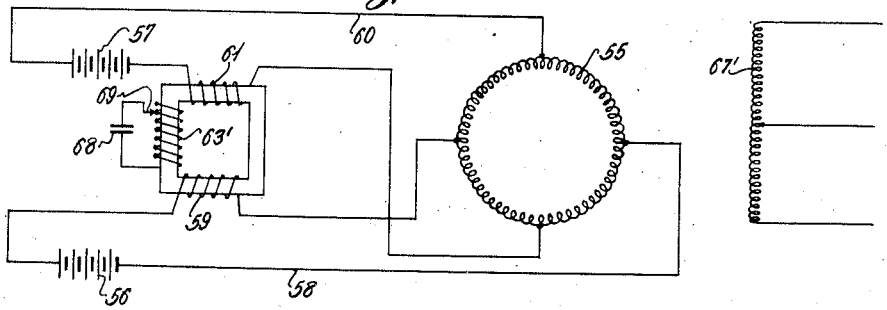
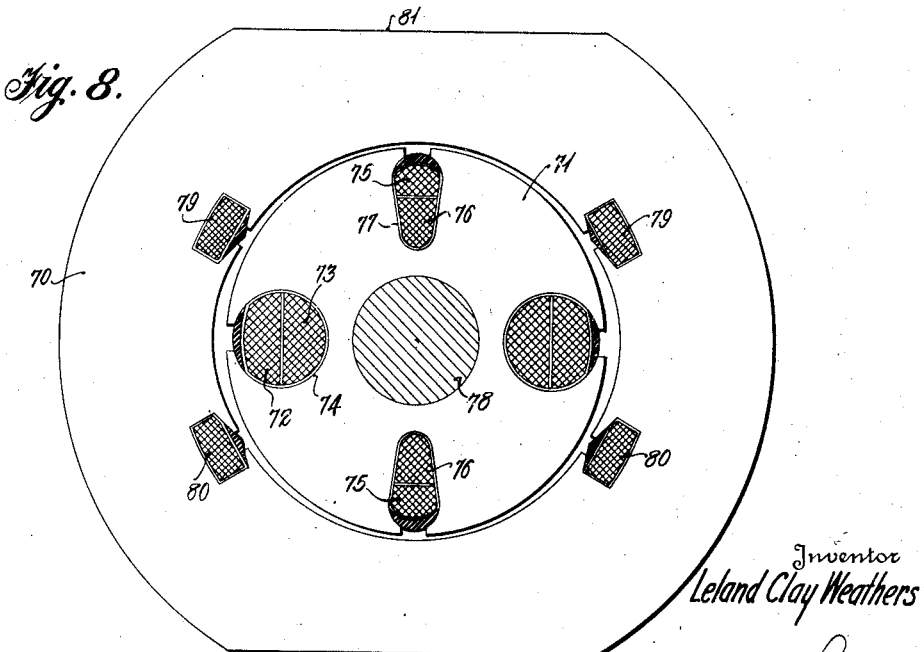

Patented Jan. 7, 1941

2,227,472

UNITED STATES PATENT OFFICE 2,227,472

MOTOR SYSTEM

Leland C. Weathers, Falls Church, Va., assignor to Dawson J. Burns, New York, N. Y.

Application June 30, 1939, Serial No. 282,278

27 Claims. (Cl. 172—274)

This invention relates to dynamoelectric machines, and more particularly to systems for improving the stability of dynamoelectric machines of the synchronous motor or generator type.

Synchronous motors and generators are supplied with direct current energization to set up a direct current field in one relatively rotating member thereof, which field cuts the conductors of the windings on the opposite member to induce alternating current voltages therein. Such machines tend to be unstable in operation, that is, the rotor tends to oscillate as well as rotate so that an oscillation of the rotor is superimposed upon the rotary motion thereof, causing what is termed "hunting." This hunting is produced by oscillating fields at right angles to the main or direct current field of the machine. It has been found, in accordance with the present invention, a quadrature circuit connected to the field windings having the same impedance as the main exciting circuit, will allow alternating currents to flow in the field winding which are of the correct phase relationship to damp out or oppose the oscillating field above referred to and prevent hunting. The most effective means of providing a quadrature circuit having the same impedance as the main exciting circuit is to employ two independent sources of exciting current having the same impedance and connected in quadrature to the same closed field winding. However, a separate winding can be employed for connection to the second source of direct current or an external impedance having substantially the same impedance as the direct current source can be employed in a quadrature circuit either connected to the same closed field winding or to a separate winding.

By employing two exciting circuits in quadrature with each other and inductively coupling the same, it has also been found that the effects above referred to can be increased and also, by employing a third circuit inductively coupled to the exciting circuits, the transient reactance and the apparent synchronous reactance of single phase machines can be controlled. The reactance voltages can be transformed to higher voltages so that static condensers of practical size can be employed to produce a condition of partial resonance and reduce the reactances. Such an arrangement is of particular value in high speed single phase machines, for example machines designed for operation with alternating current having a frequency of several hundred cycles as the reactances are very high at such frequencies. Also, the arrangement under discussion can be employed for high speed voltage control of the output of single phase generators while at the same time rendering the machines entirely stable. Furthermore, such an arrangement can be employed for reducing the transient reactance of conventional polyphase synchronous machines. It is known that such machines may become unstable due to their transient reactance, particularly when connected to long transmission lines and operating at high loads. By reducing their transient reactance in accordance with the present invention, a much greater load can be safely imposed upon a given size machine under the conditions mentioned.

It is, therefore, an object of the invention to provide an improved system for increasing stability of synchronous motors and generators.

Another object of the invention is to provide a motor system for preventing hunting in synchronous alternators and generators.

Another object of the invention is to provide an improved system for damping out oscillating fields in synchronous motors and generators which tend to cause hunting of such machines.

Another object of the invention is to provide a system of preventing hunting in synchronous motors and generators in which a circuit in quadrature with the main exciting circuit is employed to damp out oscillating fields in the machines.

Another object of the invention is to provide a system for preventing hunting in synchronous motors and generators in which quadrature exciting circuits having the same impedance are employed to damp out quadrature oscillating fields in said machines.

A further object of the invention is to provide an improved system of producing the transient reactance of synchronous machines.

A still further object of the invention is to provide an improved single phase generator and system for stabilizing the same while at the same time providing voltage regulation.

Other objects and advantages of the invention will appear in the following description of preferred embodiments of the invention shown in the attached drawings, of which:

Figure 6 is a schematic diagram of a generator employing a dual transformer connecting separate exciting circuits;

Figure 7 is a diagram similar to that of Figure 6 showing a modified connection of the tertiary circuit for the dual transformer; and Figure 8 is a diagrammatic view through a single phase alternator, particularly adapted for employment with the circuits of Figures 6 and 7.

Figure 1:
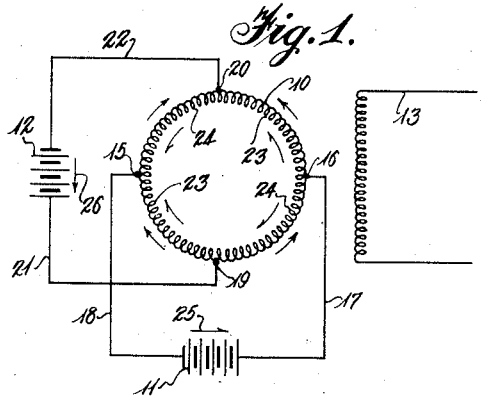
Figure 1 is a schematic diagram of a synchronous motor or generator provided with quadrature exciting circuits.

Referring more particularly to the drawings, Figure 1 represents a synchronous motor or generator having a field winding 10 arranged to be connected to two sources 11 and 12 of direct current. The sources 11 and 12 are shown as batteries, but may be any suitable independent sources of direct current such as direct current generators. The field winding 10 is positioned upon one of the relatively rotatable members of the machine and an alternating current winding 13 is positioned upon the other member. The alternating current winding 13 is shown as a single phase winding, but may obviously be a polyphase winding. Either the winding 10 or the winding 13 may be positioned upon the rotor. It will be understood throughout the description of the various drawings of the application that slip rings may be employed wherever necessary for making such external connections.

The source of direct current 11 is connected to diametrically opposed points 15 and 16 of the field winding 10 through conductors 17 and 18 and the direct current source 12 is likewise connected to diametrically opposed points 19 and 20 of the field winding 10 through conductors 21 and 22. It will be noted that the points of connection 15 and 16 for the source 11 are displaced 90 electrical degrees from the points of connection 19 and 20 for the source 12, so that the two sources are connected in quadrature to the field winding 10. It will be further noted that the field winding is thus divided into quadrants and that opposite quadrants 23 carry field current if the voltages of the two sources are the same, while the other opposite quadrants 24 carry no current. That is to say, the current from the source 11 shown by the half arrows 25 opposes the current from the source 12 shown by the full arrows 26 in the quadrants 24 of the field winding 10 and adds in the quadrants 23. Thus, the wire in the quadrants 24 may be of much smaller size than that in the quadrants 23, and the quadrants 24 could even be omitted so far as the excitation of the machine is concerned. However, the quadrants 24 provide a path for alternating currents which oppose the oscillating field causing hunting in the machine and harmonics in the output thereof. The smaller size wire in the quadrants 24 reduces the cost of the machine, and also smaller slots can be employed therefor, so that a machine having a given capacity may be of less size.

Figure 2:
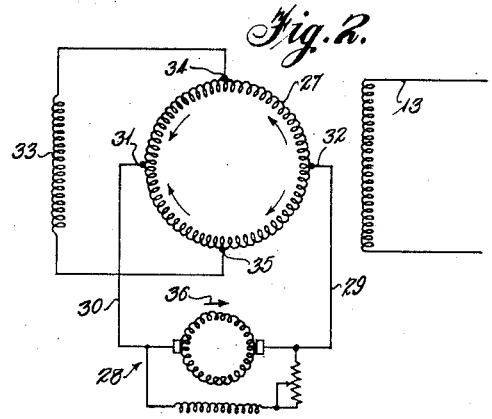
Figure 2 is a similar diagram in which a quadrature circuit having substantially the same impedance as the exciting circuit is employed.

In the modification shown in Figure 2, the field winding 27 is connected to an exciter 28 through conductors 29 and 30. These conductors are connected to the field winding 27 at diametrically spaced points 31 and 32. Instead of employing a second exciter in a quadrature circuit, an external impedance 33 having substantially the same impedance both as to amount and kind as the exciter 28 is also connected across the field winding at diametrically spaced points 34 and 35, the points of connection 34 and 35 being spaced 90 electrical degrees from the points of connection 31 and 32. This arrangement likewise provides a path for currents of the proper phase to set up a field opposing the oscillating field causing hunting and instability of the machine. It will be noted, however, that all of the conductors of the field winding carry exciting current, as shown by the arrows 36. Thus all of the wire must be of the same size. Furthermore, varying the exciter voltage or speed may vary the impedance of the exciter circuit so that it may be difficult to maintain the impedance of the quadrature circuit including the impedance 33 the same as the impedance of the exciter circuit. While the arrangement of Figure 2 improves the stability of synchronous motors and generators, it is not, in general, as effective as the duel excitation circuit of Figure 1.

Figure 3:
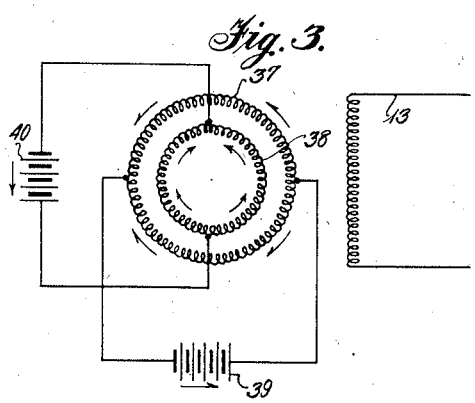
Figure 3 is a diagram similar to Figure 1 showing the employment of separate field windings.
Figure 4:
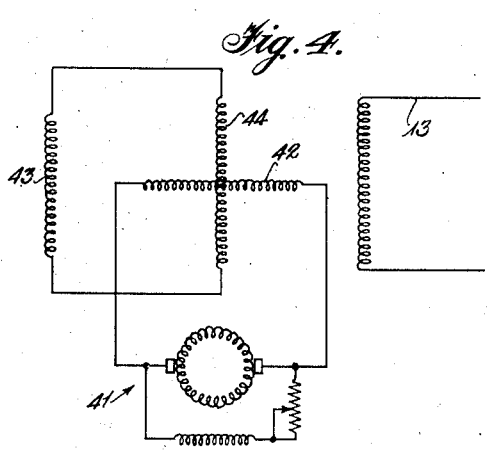
Figure 4 is a diagram similar to Figure 2, showing the employment of a different type of separate field windings.

In the modification of Figure 3, two field windings 37 and 38 are employed upon the same member of the motor. Two sources 39 and 40 of exciting current are employed, one source 39 being connected across the field winding 37 and the other source 40 being connected across the field winding 38. The points of connection of the source 39 to the field winding 37 are in quadrature to the points of the connection of the source 40 to the field winding 38. This arrangement also provides paths for the alternating currents opposing the oscillating field above referred to, but is not as effective as the circuit of Figure 1, and furthermore it will be noted that all of the field windings carry current such that a much greater amount of wire must be placed on the field structure than is the case in Figure 1. It is possible to substitute an external impedance for one of the sources of direct current of Figure 3, in a manner similar to that shown in Figure 2. Such an arrangement employing a different type of field windings is shown in Figure 4, in which an exciter 41 is connected across a single circuit field winding 42, and an external impedance 43 is connected acoss a second single circuit field winding 44 in quadrature to the field winding 42. If the circuit including the impedance 43 and the field winding 44 has substantially the same impedance as the circuit including the exciter 41 and the field winding 42, paths for alternating currents of proper phase relation to damp the oscillating fields above referred to are provided so that hunting and instability are prevented. However, in this case also, all of the windings on the field structure of the motor or generator carry current and the device is not as effective as that of Figures 1 or 2.

Figure 5:
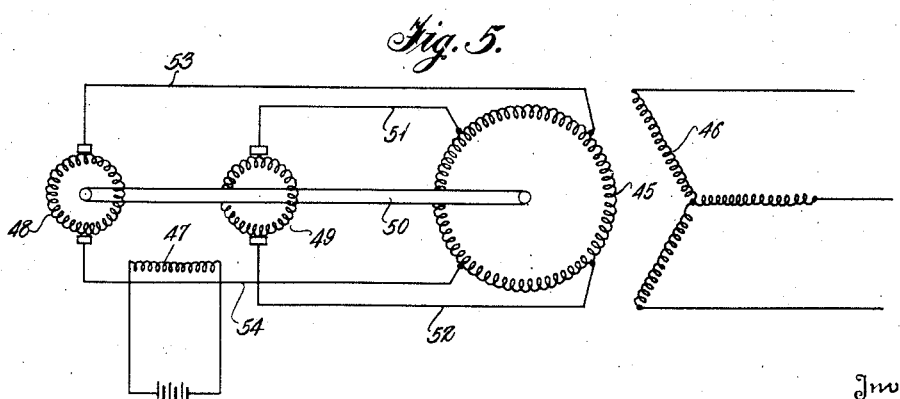
Figure 5 is a schematic diagram of a three phase machine showing quadrature exciting circuits employing separate exciters.

In Figure 5 is shown a suitable arrangement for a synchronous motor or generator provided with a field winding 45 upon one member of the motor and an alternating current winding 46 upon the other member of the motor. The alternating current winding is shown as a three phase winding but other polyphase and single phase windings may be employed. A duel exciter having the same field winding 47 but separate commutated windings 48 and 49 may be provided and can, for example, be directly connected to the shaft 50 of the motor or generator. The commutated windings 48 and 49 form independent sources of direct current which may be employed to provide dual excitation of the field winding 45 of the motor or generator. Thus, one source of direct current 49 is connected across the field winding 45 by conductors 51 and 52 and the other source of direct current 48 is connected through conductors 53 and 54 across the field winding 45 in quadrature with the source 49. If the direct current sources 48 and 49 have substantially the same impedance, paths are provided for alternating currents which damp out any oscillating fields causing hunting or instability in the operation of the generator or motor.

In Figure 6 is shown a further modification in which a field winding 55 of a synchronous motor or generator is dually excited from separate sources of direct current 56 and 57 shown as batteries but which may be any type of independent sources of direct current. The source 56 has one side connected to the field winding 55 through a conductor 58 and the other side connected through a transformer winding 59 to the winding 55. The source 57 is connected across the field winding 55 in quadrature with the source 56 through a conductor 60 and another transformer winding 61. The transformer windings 59 and 61 are positioned upon the same transformer core 62 and are so connected that the magnetomotive force set up by the direct current flowing through the winding 59 opposes that set up by the direct current flowing through the winding 61 so that no substantial amount of flux is produced by the direct current in the core 62. Any alternating currents produced by the oscillating fields above referred to in the field winding 55, or any harmonics present in the field winding, however, produce flux in the core 62, and the windings 59 and 61 act as choke coils for such currents. The degree of choking produced by such windings can be controlled by a tertiary winding 63 positioned upon the core 62 and connected to a resistance 64. The resistance 64 may be made variable as by an adjustable contact 65. For example, when the resistance 64 is relatively high, the windings 59 and 61 provide a high impedance for alternating currents while, if the resistance 64 is short circuited, the windings 59 and 61 provide a relatively low impedance for alternating currents, since the winding 63 then acts as a short circuited transformer winding. Adjustment of the resistor 64 has no effect upon the direct current resistance of the windings 59 and 61, which resistance may be made very low.

Condensers 66 and 67 may be shunted across the quadrature circuits including the sources 56 and 57, respectively, to provide a path for alternating currents when the impedance of the windings 59 and 61 is made relatively high. The impedance of the coils 59 and 61 is predominantly resistive due to the resistance 64 connected across the winding 63 and is also somewhat inductive. The impedance of the condensers 66 and 67 is predominantly capacitive. By short circuiting the resistance 64, low resistance circuits in parallel with the capacitive impedance of the condensers 66 and 67 are provided so that the impedance for alternating currents produced in winding 55 is predominantly resistive. By increasing the resistance of the resistance 64, the resistance of the coils 59 and 61 can be made very high, so that a high resistance circuit in parallel with a capacitive circuit is produced and the impedance to alternating currents produced in the winding 55 is predominantly capacitive.

The alternating current winding 67' is shown as being single phase three wire, but two wire windings or polyphase windings may be employed. In a properly designed single phase alternator, adjustment of the resistor 64 of the circuit of Figure 6 may be employed for high speed voltage regulation of an alternator, as will be hereinafter described with reference to Figure 8.

A modified circuit is shown in Figure 7 which can be also employed for a similar purpose. The circuit of this figure is entirely similar to that of Figure 6, except that the condensers 66 and 67 of Figure 6 have been eliminated, the tertiary transformer winding 63' is arranged as a tap changing winding with a condenser 68 variably connected thereto by means of an adjustable tap 69. Otherwise, the same reference numerals employed in Figure 6 have been employed on Figure 7. The winding 63' may have a large number of turns as compared to the windings 59 and 61, so that the alternating currents and voltages produced in field winding 55 and flowing through windings 59 and 61 are transformed to a high voltage and low current so that a relatively small sized condenser 68 can be employed to produce a large capacitive effect. By varying the voltage across the condenser 68 by varying the position of the tap 69, the capacitive reactance to the alternating currents referred to can be made very small or very great. When full voltage is applied across the condenser 68, the reactance to these alternating currents is predominantly capacitive, whereas by shifting the tap 69 so as to reduce the voltage applied across the condenser 68, the capacity of reactance is decreased and will even become inductive as the voltage across the condenser becomes very small, since the transformer windings 59 and 61 would normally have a high inductive reactance if the condenser 68 were removed. Thus, by shifting the tap 69, the reactance to the alternating current produced in winding 55 can be changed from inductive to capacitive and from capacitive to inductive.

The circuits of Figures 6 and 7 are particularly useful with a high speed, high frequency, single phase alternator such as that disclosed in Figure 8. Such a generator may be a light weight machine suitable for use on airplanes wherein the generator is driven by a wind actuated element. By making such generators for high speed rotation so as to generate relatively high frequency, for example, a frequency of 420 cycles per second, the machines can be made very light in weight while producing a large amount of power usable for lighting and power purposes on airplanes. While such alternators produce relatively large amounts of power in proportion to their weight, they are extremely unstable and the voltages produced thereby vary widely depending upon the speed of the airplane. In accordance with the present invention, such generators can be made extremely stable and voltage regulation can be accomplished.

The improved generator of the present invention is provided with a stator 70 and a rotating field structure 71. The rotor 71 is arranged for dual excitation and provided with concentrated windings. The main exciting windings comprise two coils 72 and 73 positioned in opposite circular slots 74. These coils correspond, for example, to the current carrying quadrants 23 of Figure 1. The circular slots provide the greatest winding area with the least amount of slot insulation, thus enabling the greatest amount of wire to be placed in the slot within a minimum of iron removed from the rotor. The stabilizing coils 75 and 76, which would correspond to the quadrants 24 of Figure 1, are positioned in narrow slots 77. As the coils 76 are of much smaller wire and carry a lesser amount of current, narrower slots 77 may be employed. The use of concentrated windings in the arrangement illustrated enables a rotor having low reluctance to be provided with a large amount of wire. The arrangement also enables a relatively large shaft to be employed in order to prevent vibration during high speed operation of the device while still obtaining a rotor having low reluctance.

The stator structure is provided with two coils 79 and 80 having a two-thirds coil pitch to eliminate odd harmonics, as hereinafter explained. Not only does this arrangement eliminate harmonics, but it provides for connecting the machine as a three wire single phase alternator. Concentrated windings are employed in the stator structure in order to enable a greater amount of wire to be employed with a minimum of reluctance in the field structure. In order that the stator may have substantially equal reluctance for any position of the rotor, the outer periphery of the stator wire is made non-circular by removing portions thereof at 81 so that the cross section of the iron adjacent the portion 81 is substantially the same as that adjacent the coils 79 and 80. This also cuts down the weight of the stator.

Since the employment of large slots for the stator coils 79 and 80 tends to induce harmonics in the generated voltage, the inner periphery of the stator iron has been made non-circular to cut down the field strength in the air gap adjacent these slots to thereby reduce such harmonics. This construction also reduces the zig-zag leakage flux. The inner periphery of the stator iron must, however, be a symmetrical curve in order to prevent introducing a large number of harmonics. It has been found that, if the length of the air gap is made to vary in accordance with the expression $L = {}^1(a - b \cos 2\theta)$ where L is the length of the air gap, $a$ and $b$ are constants and $\theta$ is the angle between the point of minimum air gap and the point being considered, a second harmonic only will be produced in the field by reason of the non-uniform air gap. The flux density in the air gap is in substantial inverse proportion to the length of the air gap as the reluctance of the air gap is large with respect to the reluctance of the iron. Therefore, the flux density in the air gap is proportional to the $a - b \cos 2\theta$, which causes a second harmonic to be induced in the conductors of the field winding. If the field circuit is such that second harmonic currents flow therein, these currents will set up a field which produces a fundamental and a third harmonic in the armature or stator windings. The two-thirds coil pitch employed in the stator windings cancels out the third harmonic. Any higher harmonics are negligible in a relatively high frequency alternator such as that under consideration, as the impedance of the stator windings is relatively high for such harmonics.

If the circuit through which the second harmonic currents in the field flow is inductive, the second harmonic currents produce a fundamental in the stator windings which opposes the fundamental normally generated therein, whereas, if the circuit referred to is capacitive, the fundamental produced by the second harmonic currents in the rotor add to the fundamental normally generated. The circuits of Figures 6 and 7, therefore, may be employed to regulate the voltage produced by the alternator without changing the voltage of the direct current sources. That is, the circuit of Figure 6 can be made more capacitive by decreasing the resistance 64 to increase the voltage of the alternator and vice versa, or the variable tap 69 of Figure 7 may be changed to render the field circuit either inductive or capacitive to vary the voltage. The voltage regulation action is extremely rapid as compared to devices in which the voltage is regulated by changing the value of the direct current energization of the field. Any suitable automatic device responsive to the output voltage may be employed to vary the resistance of the resistor 65 of Figure 6 or the position of the tap 69 of Figure 7.

In the alternator just described, the iron of the stator is given the conformation above described to deliberately produce a second harmonic in the field winding. This second harmonic is then employed for voltage control. By the form of the stator member described, not only is the voltage control provided, but tooth harmonics are largely eliminated. Also, the position of the stator coils cancels out the third harmonic resulting from second harmonic currents in the rotor. While concentrated windings of the type shown are preferred in a small size single phase generator, it is apparent that a greater number of coils may be employed, particularly in larger machines, if the coil pitch of the stator windings is two-thirds and the rotor windings are relatively concentrated.

While the circuit of Figure 6 is particularly adaptable to the generator of Figure 8, i. e. relatively small size alternators for higher frequencies than ordinary power circuits, the circuit of Figure 7 may be advantageously employed with even extremely large size generators to reduce the transient reactance. Properly designed large size polyphase machines do not ordinarily produce substantial harmonics in either the field or alternating current winding. However, the transient reactance of such machines, particularly when connected to long transmission lines, renders the machines relatively unstable and necessitates that they be of much greater kva. rating than their usable kw. output. A condenser 68 of relatively small size can be employed in a circuit similar to Figure 7 to reduce the transient reactance of the alternators such that their power output can be very substantially increased without danger of instability. The sources of direct current 56 and 57 shown in Figures 6 and 7 can, of course be direct current machines, particularly for large size installations.

This application is a continuation in part of my copending application Serial No. 220,542, filed July 21, 1938.

While I have described the preferred embodiments of my invention, it is understood that the details thereof may be varied within the scope of the following claims.

I claim:
1. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, a source of direct current, an exciting circuit including said source of direct current connected to said exciting windings to produce a direct current field in said machine, and means for stabilizing the operation of said machine, said means comprising a second circuit having a total impedance substantially equal to the total impedance of said exciting circuit and connected to said exciting windings in quadrature with said exciting circuit.

2. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, a source of direct current, an external exciting circuit including said source of direct current connected to said exciting windings to produce a direct current field in said machine, said exciting windings forming a single closed circuit in said machine, and means for stabilizing the operation of said machine, said means comprising a second circuit having a total impedance substantially equal to the total impedance of said exciting circuit and connected to said exciting windings in quadrature with said exciting circuit.

3. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, a source of direct current, an exciting circuit including said source of direct current connected to said exciting winding to produce a direct current field in said machine, and means for stabilizing the operation of said machine comprising a second circuit having an external impedance in series therewith which is substantially equal to the impedance of said source, said second circuit being connected to said exciting windings in quadrature with said exciting circuit.

4. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, two independent sources of direct current, and two exciting circuits each including one of said sources, said exciting circuits being connected to said field windings in quadrature with each other.

5. In a system for stabilizing the operation of synchronous dynamoelectric machines, a synchronous machine having relatively rotatable members, alternating current windings upon one of said members connected to an external circuit to provide for a flow of power currents therethrough, exciting windings upon the other of said members, two independent sources of direct current, and two exciting circuits each including one of said sources, the total impedance of one of said exciting circuits being substantially equal to the total impedance of the other of said exciting circuits.

6. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, two independent sources of direct current, and two exciting circuits each including one of said sources, and means other than said exciting windings for inductively coupling said exciting circuits.

7. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, two independent sources of direct current, two exciting circuits each including one of said sources, said exciting circuits being connected to said field windings in quadrature with each other, and means other than said exciting windings for inductively coupling said exciting circuits and inductively coupling the same to a third circuit containing an impedance therein.

8. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, two independent sources of direct current, two exciting circuits each including one of said sources, said exciting circuits being connected to said field windings in quadrature with each other, means other than said exciting windings for inductively coupling said exciting circuits and inductively coupling the same to a third circuit containing a resistance therein, and means to vary the value of said resistance.

9. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, two independent sources of direct current, two exciting circuits being connected to said field windings in quadrature with each other, means other than said exciting windings for inductively coupling said exciting circuits and inductively coupling the same to a third circuit containing a resistance therein, and means to vary the value of said resistance, said exciting circuits each having a condenser connected across the same adjacent said exciting windings.

10. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, two independent sources of direct current, two exciting circuits each including one of said sources, said exciting circuits being connected to said field windings in quadrature with each other, and means other than said exciting windings for inductively coupling said exciting circuits and inductively coupling the same to a third circuit containing an impedance therein, said exciting circuits each having a condenser connected across the same adjacent said exciting windings.

11. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, two independent sources of direct current, two exciting circuits each including one of said sources, said exciting circuits being connected to said field windings in quadrature with each other, and means other than said exciting windings for inductively coupling said exciting circuits and inductively coupling the same to a third circuit containing a condenser in series therewith.

12. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, two independent sources of direct current, two exciting circuits each including one of said sources, said exciting circuits being connected to said field windings in quadrature with each other, and means other than said exciting windings for inductively coupling said exciting circuits and inductively coupling the same to a third circuit containing a condenser in series therewith, said means comprising an iron core provided with three windings thereon, one of said last-mentioned windings being connected in series with each of said exciting circuits and the third of said last-mentioned windings being connected in series with said third circuit, the third of said last-mentioned windings having a greater number of turns than the other windings on said core to increase the alternating current voltage applied to said condenser.

13. In a system for stabilizing the operation of synchronous dynamoelectric machines, a synchronous machine having relatively rotatable members, alternating current windings upon one of said members connected to an external circuit to provide for the flow of power currents therethrough, exciting windings upon the other of said members, two independent sources of direct current, two exciting circuits each including one of said sources, said exciting circuits being connected to said field windings in quadrature with each other, means other than said exciting windings for inductively coupling said exciting circuits and inductively coupling the same to a third circuit containing a condenser in series therewith, said means comprising an iron core provided with three windings thereon, one of said last-mentioned windings being connected in series with each of said exciting circuits and the third of said last-mentioned windings being connected in series with said third circuit, said third winding having a greater number of turns than the other windings on said core to increase the alternating current voltage applied to said condenser, and means to vary the voltage applied across said condenser.

14. In a system for stabilizing the operation of single phase generators and providing for high speed voltage control thereof, a synchronous generator having relatively rotatable members, an alternating current winding upon one of said members connected to an external circuit to provide for the flow of power currents therethrough, exciting windings upon the other of said members, two sources of direct current, two electrically independent exciting circuits each including one of said sources of direct current, said exciting circuits being connected across said exciting windings in quadrature with each other to produce a resultant direct current field in said machine, said exciting circuits being inductively coupled to each other and to a third circuit having a condenser therein, said generator having a non-uniform air gap to produce a second harmonic in said exciting windings, said generator being constructed to suppress the third harmonic in said alternating current windings, and means to vary the voltage applied to said condenser by said third winding to vary the output voltage of said generator.

15. In a system for stabilizing the operation of single phase generators and providing for high speed voltage control thereof, a synchronous generator having relatively rotatable members, an alternating current winding upon one of said members connected to an external circuit to provide for the flow of power currents therethrough, exciting windings upon the other of said members, two sources of direct current, two electrically independent exciting circuits each including one of said sources of direct current, said exciting circuits being connected across said exciting windings in quadrature with each other to produce a resultant direct current field in said machine, said exciting circuits being inductively coupled to each other and to a third circuit having a capacitive reactance therein, said generator having a non-uniform air gap to produce a second harmonic in said exciting windings, said generator being constructed to suppress the third harmonic in said alternating current windings, and means to vary the capacitive reactance of said third circuit to vary the output voltage of said generator.

16. In a system for stabilizing the operation of single phase generators and providing for high speed voltage control thereof, a synchronous generator having relatively rotatable members, an alternating current winding upon one of said members connected to an external circuit to provide for the flow of power currents therethrough, exciting windings upon the other of said members, two sources of direct current, two electrically independent exciting circuits each including one of said sources of direct current, said exciting circuits being connected across said exciting windings in quadrature with each other to produce a resultant direct current field in said machine, said exciting circuits being inductively coupled to each other and to a third circuit having an impedance therein, said generator having a non-uniform air gap to produce a second harmonic in said exciting windings and being constructed to suppress the third harmonic in said alternating current windings, and means to vary the value of said impedance to vary the reactance of said field windings in order to control the output voltage of said generator.

17. A structure as defined in claim 16 in which the length of the air gap varies in accordance with the relation $L=1/(a-b \cos 2\theta)$ where L is the length of the air gap, $a$ and $b$ are constants and $\theta$ is the electrical angle from the point of minimum length of air gap.

18. A structure as defined in claim 16 in which the pitch of the coils of the alternating current winding is two-thirds in order to cancel out third harmonics induced therein by second harmonic currents in said exciting windings.

19. In a system or controlling the output voltage of single phase generators, a single phase synchronous generator having relatively rotatable members, an alternating current winding upon one of said members connected to an external circuit to provide for the flow of power currents therethrough, exciting windings upon the other of said members, a source of direct current, an exciting circuit including said source connected to said exciting windings to produce a direct current field in said machine, said generator having a non-uniform air gap to produce a second harmonic in said exciting windings and being constructed to suppress the third harmonic in said alternating current windings, and means to vary the reactance of said exciting circuit to vary the output voltage of said generator.

20. In a system for stabilizing the operation of single phase generators and providing for high speed voltage control thereof, a synchronous generator having relatively rotatable members, an alternating current winding upon one of said members connected to an external circuit to provide for the flow of power currents therethrough, exciting windings upon the other of said members, two sources of direct current, two electrically independent exciting circuits each including one of said sources of direct current, said exciting circuits being connected across said exciting windings in quadrature with each other to prdouce a resultant direct current field in said machine, said exciting circuits being inductively coupled to each other and to a third circuit having a resistance therein, said generator having a non-uniform air gap to produce a second harmonic in said exciting windings and being constructed to suppress the third harmonic in said alternating current windings, a condenser connected across each of said exciting circuits adjacent said exciting windings, and means to vary the value of the resistance in said third circuit to vary the output voltage of said generator.

21. A single phase alternating current generator having relatively rotatable members, alternating current windings upon one of said members connected to an external circuit to provide for the flow of power currents therethrough, exciting windings upon the other of said members adapted to be connected to a direct current source to provide a direct current field in said generator, the members of said generator being formed to produce a non-uniform air gap in which the length of the air gap varies in accordance with the relation $$L=1/(a-b \cos 2 \theta)$$

where L is the length of the air gap, $a$ and $b$ are constants, and $\theta$ is the electrical angle from the point of minimum length of air gap.

22. A single phase alternating current generator having relatively rotatable members, alternating current windings upon one of said members connected to an external circuit to provide for the flow of power currents therethrough, exciting windings upon the other of said members adapted to be connected to a direct current source to provide a direct current field in said generator, said generator having a circular rotor and a stator having an inner surface formed to provide a non-uniform air gap which varies in accordance with the relation $L=1/(a-b \cos 2 \theta)$ where L is the length of the air gap, $a$ and $b$ are constants, and $\theta$ is the electrical angle from the point of minimum length of air gap.

23. A structure as defined in claim 22 in which the exciting windings are concentrated substantially in two radial planes in electrical quadrature with each other.

24. A structure as defined in claim 22, in which the exciting windings are concentrated substantially in two radial planes in quadrature with each other, and in which the exciting windings are excited from two electrically independent sources of direct current so that the exciting windings in one of said planes carry substantially no exciting current.

25. A structure as defined in claim 22, in which the alternating current windings are placed on the stator member and have a two-thirds coil pitch to cancel out third harmonics.

26. A structure as defined in claim 22, in which the stator is provided with large slots adjacent the position of maximum air gap and concentrated windings having a two-thirds coil pitch are positioned in said slots.

27. A single phase alternating current machine having relatively rotatable members, one of said members having opposed slots positioned adjacent the air gap between said members and occupying restricted portions of the circumferential area of said member, windings positioned in said slots adapted to be connected to an external circuit to provide for the flow of alternating currents therethrough, exciting windings upon the other member adapted to be connected to a direct current source to provide a direct current field in said motor, said one member having a portion of its iron removed adjacent portions thereof spaced circumferentially from said slots so that the reluctance of the iron of said one member for said direct current field remains substantially constant for all relative positions of said members.

LELAND C. WEATHERS.

Certificate of Correction

Patent No 2,227,472.   January 7, 1941.

LELAND C. WEATHERS

It is hereby certified that errors appear in the printed specification of the above numbered patent requiring correction as follows: Page 4, first column, line 39, for "$L=^1(a-b \cos 2\theta)$" read $L=1/(a-b \cos 2\theta)$; page 5, first column, line 58, claim 5, for "a" before "flow" read *the*; page 6, second column, line 71, claim 19, for "or" read *for*; page 7, first column, line 26, claim 20, for "prdouce" read *produce*; and that the said Letters Patent should be read with these corrections therein that the same may conform to the record of the case in the Patent Office.

Signed and sealed this 30th day of September, A. D. 1941.

[SEAL]

HENRY VAN ARSDALE,
*Acting Commissioner of Patents.*